United States Patent

Schaffer et al.

[11] Patent Number: 5,268,982
[45] Date of Patent: Dec. 7, 1993

[54] FRICTION DETENT DUPLEX PLUG ASSEMBLY

[75] Inventors: Ronald R. Schaffer, Harrisburg, Pa.; Gary N. Warner, Memphis, Tenn.

[73] Assignee: The Whitaker Corporation, Wilmington, Del.

[21] Appl. No.: 906,080

[22] Filed: Jun. 29, 1992

[51] Int. Cl.⁵ .............................................. G02B 6/26
[52] U.S. Cl. ................................. 385/86; 385/76; 385/56
[58] Field of Search .................... 385/53, 55, 56, 76, 385/86, 87

[56] References Cited

U.S. PATENT DOCUMENTS

| | | | |
|---|---|---|---|
| 4,611,887 | 9/1986 | Glover et al. | 350/96.21 |
| 4,715,675 | 12/1987 | Kevern et al. | 350/96.2 |
| 4,798,440 | 1/1989 | Hoffer et al. | 350/96.2 |
| 4,944,568 | 7/1990 | Danbach et al. | 350/96.2 |
| 4,953,929 | 9/1990 | Basista et al. | 350/96.2 |
| 5,123,071 | 6/1992 | Mulholland et al. | 385/53 |

*Primary Examiner*—Rodney B. Bovernick
*Assistant Examiner*—Stephen W. Barns
*Attorney, Agent, or Firm*—Katherine A. Nelson; Driscoll A. Nina, Jr.

[57] ABSTRACT

A fiber optic plug assembly (10) including resistance-fit cover-halves (12A and 12B) which are combinative to house both simplex plugs (20) and duplex plugs (not shown) to permit duplex data transmission to take place using simplex parts.

The plug assembly (10) including the plugs (20) thereof may be quickly and easily connected and disconnected as desired.

8 Claims, 4 Drawing Sheets

FRICTION DETENT DUPLEX PLUG ASSEMBLY

FIELD OF THE INVENTION

The present invention relates to fiber optics and, in particular, to a friction detent plug assembly for terminating a fiber optic cable.

BACKGROUND OF THE INVENTION

Fiber optic technology employs a thin, flexible glass or plastic waveguide through which light can be transmitted for carrying information. The most common use of fiber optics is as a transmission link connecting two electronic circuits. In this capacity, it finds great utility in communications.

Accurate optical data communication requires precise alignment of the optical fiber(s). For this purpose, an interconnection system is provided to maintain alignment of the optical fiber(s) between a transmitter and a receiver. Such interconnection systems include precision connectors and associated hardware.

Originally, fiber optic systems utilized simplex interconnection systems with simplex connector plugs terminating a single fiber optic cable. In simplex systems, either the transmission or reception of information can take place at one time. Consequently, simplex systems are limited in the amount of information that they can transmit and receive during any given period of time.

To increase the amount of information that can be communicated over a fiber optic system, multi-channel systems were developed. Such multi-channel systems include, for example, duplex connector plugs and cables which are capable of simultaneous transmission and reception. Thus, using a duplex system enables information to be transmitted at a much higher rate.

Despite the advantages, multi-channel fiber optic systems are relatively new, and many simplex systems and parts are already in use. Hence, simplex parts are readily available and less expensive because there is an existing inventory. Moreover, it would be difficult if not cost-prohibitive to retrofit existing simplex systems with dedicated duplex or other multi-channel parts.

Consequently, a clear commercial need exists for an interconnection system which is compatible with both simplex and duplex parts and which permits the interconnection of simplex parts in a duplex configuration to provide duplex data transmission.

SUMMARY OF THE INVENTION

It is, therefore, an object of the present invention to provide a fiber optic plug assembly which is alternatively usable with both simplex and duplex plugs.

It is a further object of the present invention to provide a fiber optic plug assembly which permits duplex transmission to take place using simplex parts.

Still another object of the present invention is to provide a resistance-fit plug housing for alternatively seating therein either simplex or duplex connector plugs terminating respective simplex or duplex fiber optic cables such that the plug assembly including the connector plugs thereof may be quickly and easily connected and disconnected as desired.

In accordance with the above-described objects, the present invention provides a friction detent duplex plug assembly for alternatively seating therein either simplex or duplex connector plugs terminating respective simplex or duplex fiber optic cables. The plug assembly of the present invention comprises a first plug cover-half and a second plug cover-half formed with opposing fitted cavity therein to seat up to two simplex connector plugs terminating respective simplex fiber optic cables or, alternatively, one duplex connector plug terminating a duplex fiber optic cable. The plug cover-halves are engaged by a resistance fit to confine the two simplex connector plugs or one duplex connector plug therebetween. Hence, a pair of simplex connector plugs may be enclosed within said first and second plug cover-halves for use as a duplex connector assembly.

Preferably, the resistance fit is provided by a plurality of pins and holes formed on the respective cover-halves. The holes in each cover-half are formed opposite corresponding pins in the other cover-half, whereby a resistance fit results from frictional insertion of each pin in a corresponding hole. The cover-halves are also preferably formed with opposing channels interrupted by a support lip for clasping the fiber optic cable(s) extending from the connector plug(s) when the cover-halves are combined, thereby providing strain relief to the fiber optic cable(s).

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE DETAILED EMBODIMENT(S)

Figure 1:
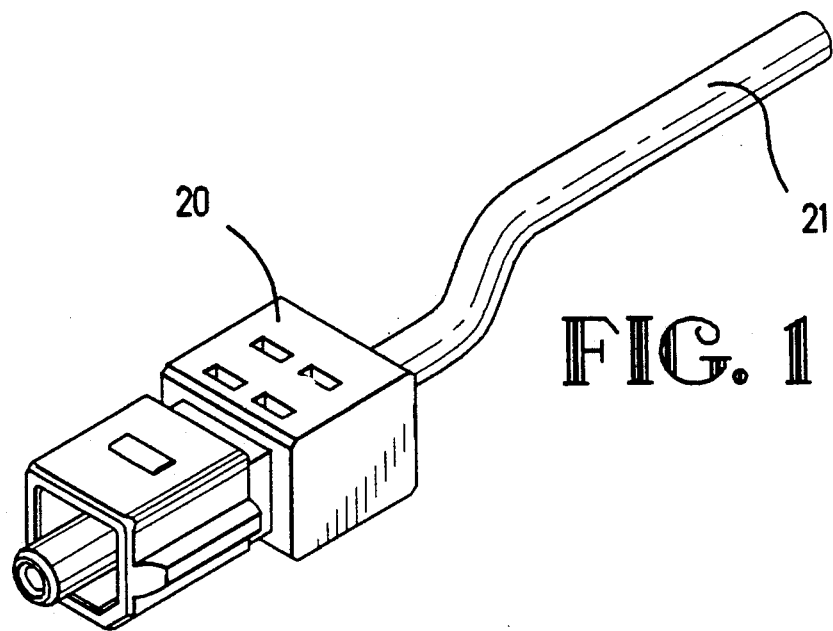
FIG. 1 is a perspective view showing a conventional dry, non-polish simplex connector plug which is suitable for use in the plug assembly of the present invention.

Referring now to the drawings, the friction detent plug assembly 10 of the present invention is adapted to alternatively receive therein conventional simplex connector plugs or duplex connector plugs. An example of such a plug is the simplex connector plug 20 which is seen in FIG. 1. Such simplex connector plugs 20 or duplex plugs (not shown) terminate respective simplex fiber optic cables 21 or duplex cables (not shown) which carry the information being transmitted.

Figure 2:
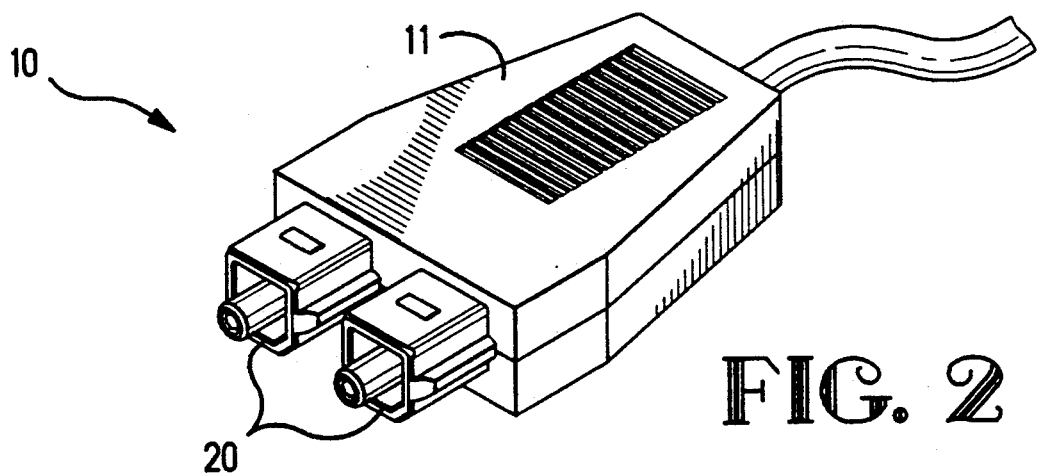
FIG. 2 is a perspective view of a preferred embodiment of the plug assembly of the present invention wherein two simplex connector plugs of FIG. 1 are housed in the assembly for providing duplex transmission with simplex parts.

FIG. 2 shows a preferred embodiment of the plug assembly 10 of the present invention wherein two simplex connector plugs 20 as in FIG. 1 are housed to provide duplex transmission with simplex parts. Plug assembly 10 includes a cover 11 which encloses both connector plugs. It should be clearly understood that the cover 11 can be various shapes.

It is further preferred that the exterior of the cover 11 include a section formed thereon that is knurled or otherwise formed with a gripping surface to facilitate insertion in a receptacle.

Figure 3:
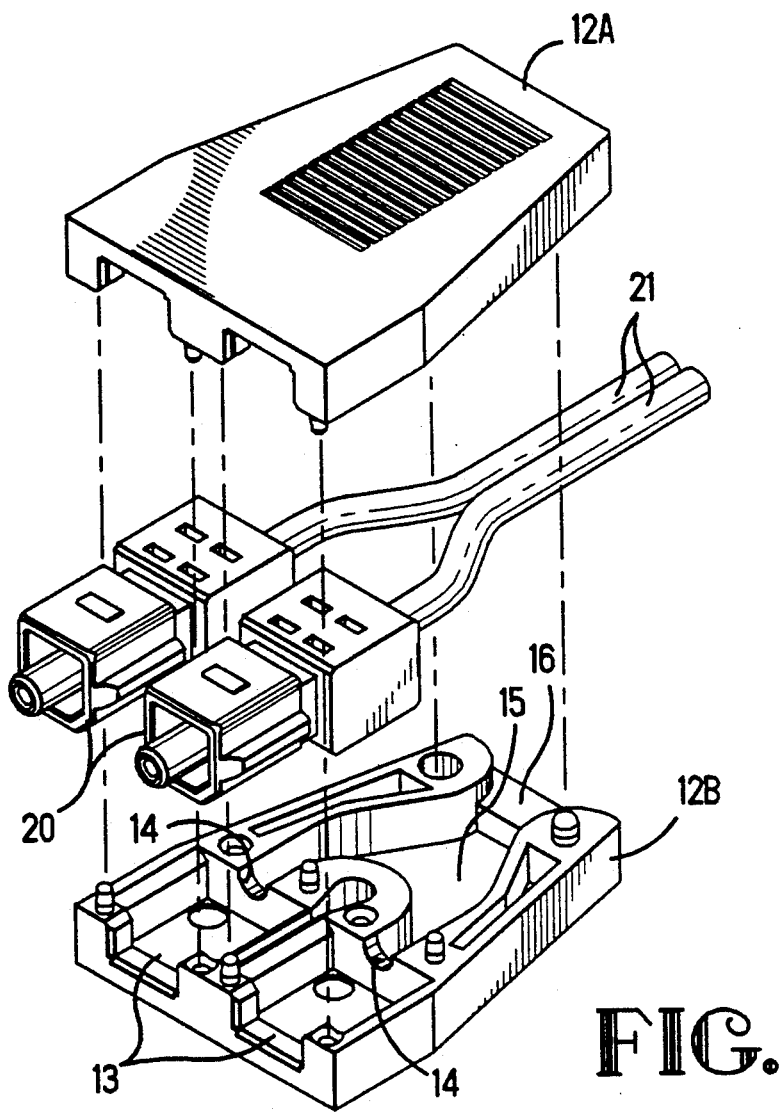
FIG. 3 is an exploded view of the plug assembly of FIG. 2 illustrating the positioning therein of the simplex connector plug(s) terminating respective simplex fiber optic cable(s)

As shown in the exploded view of FIG. 3, the cover 11 includes a pair of mating cover-halves 12A and 12B. These cover-halves 12A and 12B may be removably joined to one another with a resistance fit. This way, cover-halves 12A and 12B can be removed to gain access to the interior of the cover 11 for cleaning, repairing, changing of the plugs 20 or cables 21, or the like, as shall be discussed.

Figure 4:
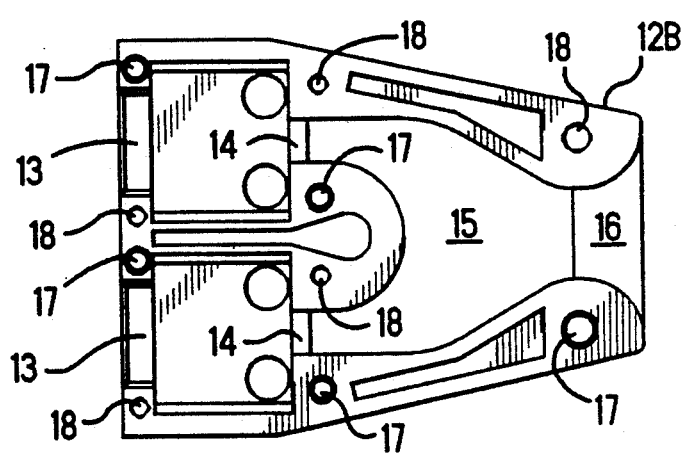
FIG. 4 is a top view of the bottom cover-half of the plug assembly of FIG. 2 with the connector plug(s) and the fiber optic cable(s) removed therefrom for the sake of clarity.

With reference to FIGS. 3 and 4, each of the cover-halves 12A and 12B has a respective pair of forward slots 13 formed therein. The slots 13 are sized and shaped so as to receive therein respective connector plugs 20 terminating respective fiber optic cables 21.

Formed in the above manner, the fitted slots 13 may receive therein up to two simplex connector plugs 20 terminating respective simplex fiber optic cables 21. In this fashion, a pair of simplex connector plugs may be utilized as a duplex connector plug assembly with one cable transmitting information while the other cable receives information. Such an arrangement permits duplex transmission to take place using simplex parts.

The slots 13 may alternatively receive therein a single duplex connector plug terminating a respective duplex fiber optic cable. In this fashion, the cover 11 may be used to selectively alternatively house simplex and duplex parts for simplex or duplex transmission.

As can be seen, the plugs 20 are received in the slots 13, such that a forward portion of the plugs 20 extends forwardly outwardly from the cover 11.

The rearward wall of each of the slots 13 has a notch 14 formed therein. These notches 14 are formed so that when the cover-halves 12 are joined to one another, the notches 14 are aligned with one another for forming respective holes through the end walls. This way, the optic cable 21 terminated by the connector plug 20 may pass through the end wall, while also being held between the end walls with a frictional grip. Cables 21 are supported rearwardly of the plugs 20, such that strain relief is provided between the plugs 20 and the cable 21.

Each of the cover-halves 12A and 12B further has a fiber optic cable housing space 15 formed therein, rearwardly adjacent to the end wall of each slot 13. This space 15 receives and houses therein the optic cable(s) 21 terminated by the plugs 20. This space 15 is, preferably, formed so as to be gradually constricted towards the rearward end of the cover 11.

The rearward end of the spaces 15 of each of the cover-halves 12A and 12B further has a respective lip 16 formed thereon. These lips 16 are aligned with one another when the cover-halves 12 are joined to one another. When the cover-halves 12 are joined to one another, a constricted space is provided between the lips 16 through which the fiber optic cables 21 may pass from the cover 11, rearwardly thereof.

The lips 16 are further formed having such a height that, when the cover-halves 12 are joined to one another, they press against and hold the fiber optic cables 21 therebetween with a frictional grip. In this manner, the fiber optic cables 21 extending from the connector plugs 20 are supported rearwardly in cover 11 such that strain relief is provided. Preferably, the lips 16 are provided with sharp inward edges to better grip the fiber optic cables 21.

Preferably, the resistance fit between mating cover-halves 12A and 12B is effected by respective pins 17 formed in each cover-half 12A and 12B and opposing holes 18 formed in the other cover-half. Each such pin 17 and hole 18 is positioned so that when the cover-halves 12A and 12B are brought together, said pin 17 in one cover-half is opposite a respective hole 18 formed in the other cover-half. The pins 17 and holes 18 are further formed so that the pins 17 are received in the respective holes 18 with a resistance fit for removably holding the cover-halves 12A and 12B together, thereby forming the cover 11. In this fashion, access to the interior of the cover 11, including the connector plugs 20 and the fiber optic cables 21 housed therein, is provided as desired for the cleaning, repairing, changing of parts (such as connector plugs 20 and cables 21) and the like.

It should be noted that the provision of access to the interior of the cover 11 permits the user to select how many and what type of plugs 20 and cables 21 are desired for the type of transmission (simplex or duplex) to be performed thereby.

Figure 5:
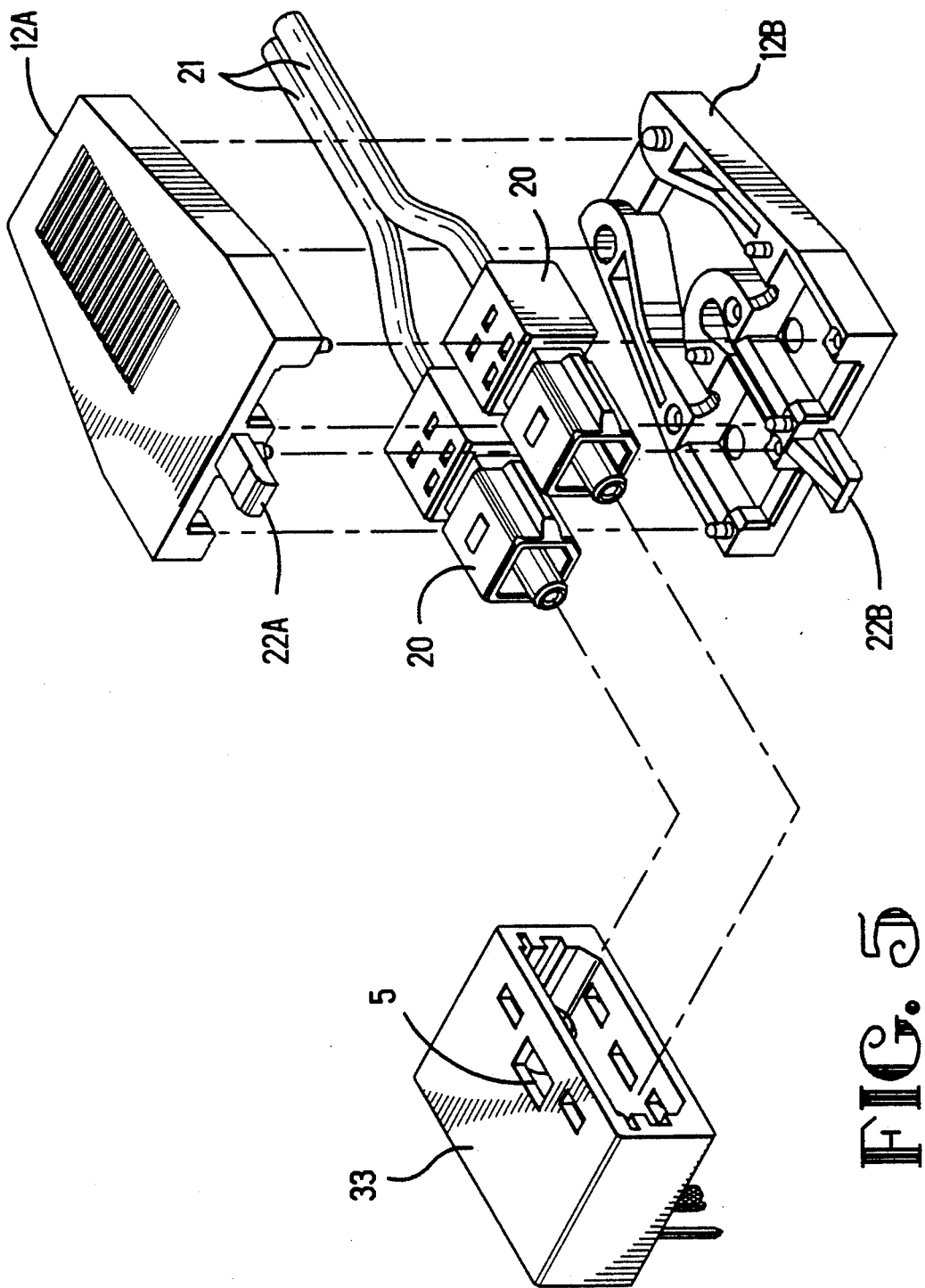
FIG. 5 is an exploded perspective view of another embodiment of the plug assembly of the present invention wherein the opposing cover-halves are equipped with central locking detent means for anchoring the plug assembly in a receptacle.

FIG. 5 shows an optional central locking means for anchoring the plug assembly in a receptacle 33. The locking means further comprises centrally positioned detent prongs 22A and 22B formed on each respective cover-half 12A and 12B. Each prong 22A and 22B has an outwardly facing ramp which tapers toward the prong tip. The detent prongs 22A and 22B provide for removably coupling and retaining the connector plug 20 of the plug assembly 10 in a receptacle therefor.

In operation, when the plug assembly 10 of the present invention is slid into a receptacle 33 therefor, the plug assembly 10 is received in the receptacle 33 with a friction grip. Further sliding of the plug assembly 10 biases the walls of the housing slightly outwardly until the assembly 10 is fully inserted within the receptacle 33. In this position, the ramped tip of the detent prongs 22A and 22B latch into a corresponding indentation 5 formed in receptacle 33. This way, the plug assembly 10 is securely retained in the receptacle 33 for use in transmitting and receiving information.

Figure 6:
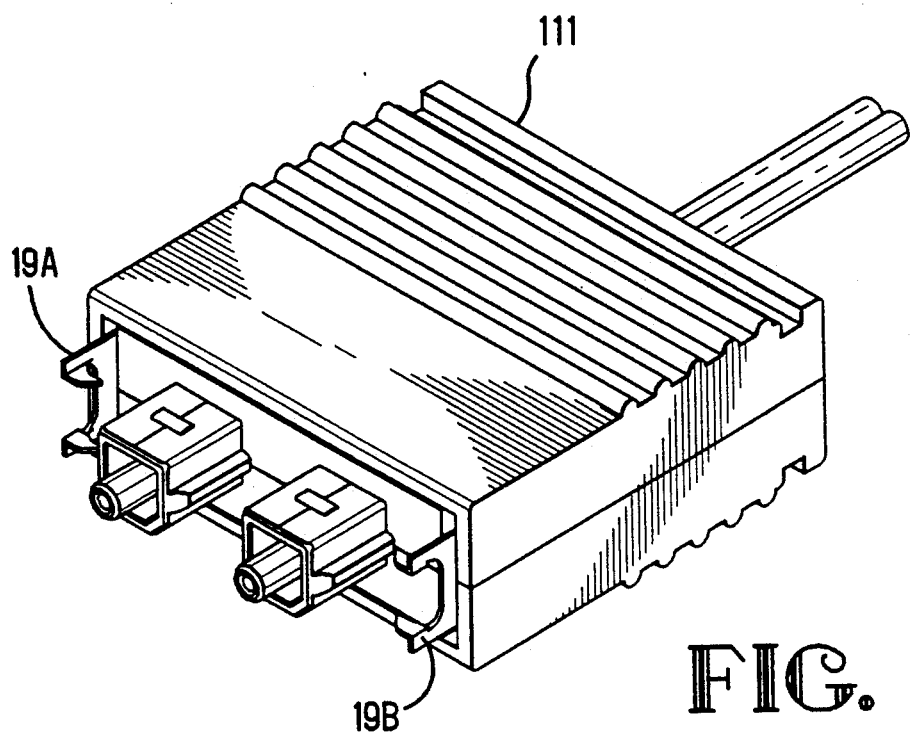
FIG. 6 is a perspective view of still another embodiment of the plug assembly of the present invention wherein the opposing cover-halves are equipped with flanking locking means for anchoring the plug assembly in a receptacle.

FIG. 6 shows another embodiment of the plug assembly of the present invention wherein the cover 111 is formed in an alternate shape. In addition, the centrally positioned locking means of FIG. 7 is replaced with flanking detent means for anchoring the plug assembly in a receptacle.

The flanking detent means further comprises clips 19A and 19B which removably grip the exterior of the receptacle (FIG. 8). This arrangement permits the plug assembly to be utilized with existing receptacles. The leading edges of the clips may include additional latching features, such as inwardly directed portions, which cooperate with corresponding indentations on a mating receptacle (not shown) to secure the mating members together, as known in the art.

Figure 7:
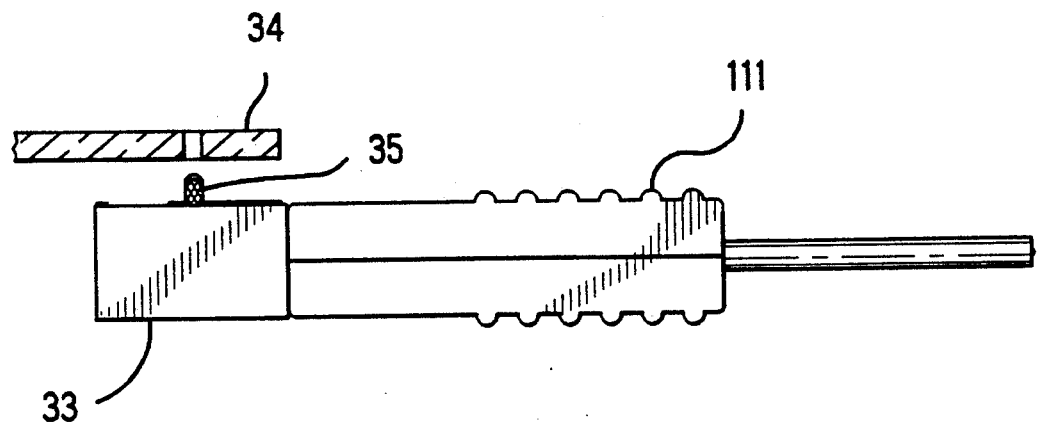
FIG. 7 is a side view of the plug assembly of FIG. 2 showing one conventional manner of attaching the plug assembly to a circuit board.

FIG. 7 is a side view of the plug assembly 111 of FIG. 6 showing one conventional manner of attachment to a circuit board 34. The receptacle 33 is provided with a protruding pylon 35 which is received in a through-bore formed in the circuit board 34. The pylon 35 is preferably formed with a gripping surface to insure a secure anchor. In addition, pylon 35 may be glued, soldered, or otherwise attached to circuit board 34. This way, plug assembly 111 is firmly held against circuit board 34 when it is inserted in receptacle 33.

It can be readily seen how the friction plug assembly 10 of the present invention provides a substantial benefit in the art of fiber optics. Plug assembly 10 permits simplex parts and facilities to be utilized for duplex data transmission. Moreover, plug assembly 10 can alternatively receive therein either simplex or duplex components. Hence, it may be used in all types of equipment. It is also to be understood that the plug assembly of the present invention is suitable for use with other multichannel systems and is not to be limited to the duplex arrangement. Finally, plug assembly 10 may be quickly and easily connected to and disconnected from a receptacle without the need for retaining plates or screws.

Obviously, many modifications may be made without departing from the basic spirit of the present invention. Accordingly, it will be appreciated by those skilled in the art that within the scope of the appended claims, the invention may be practiced other than has been specifically described herein.

We claim:

1. A friction detent duplex plug assembly, comprising:
   a first plug cover-half formed with a fitted cavity therein for seating up to two simplex connector plugs terminating respective simplex fiber optic cables or, alternatively, one duplex connector plug terminating a duplex fiber optic cable; and a second plug cover-half formed with an opposing fitted cavity, said second plug cover-half being combinative with said first plug cover half by resistance fit to confine said two simplex connector plugs or one duplex connector plug therebetween;
   whereby a pair of simplex connector plugs may be enclosed within said first and second plug cover-halves for use as a duplex connector plug assembly.

2. The friction detent duplex plug assembly of claim 1, wherein said first plug cover-half and second plug cover-half are formed with opposing channels extending rearwardly from said cavities and exiting said cover-halves, said channels forming a conduit when said second plug cover-half is combined with said first plug cover-half for accommodating said two simplex fiber optic cables or, alternatively, said one duplex fiber optic cable.

3. The friction detent duplex plug assembly of claim 2, wherein at least one of said opposing channels of said first plug cover-half and second plug cover-half is formed with a support lip therein for clasping the fiber optic cable extending from the connector plug when said second plug cover-half is combined with said first plug cover-half, thereby providing strain relief to said fiber optic cable.

4. The friction detent duplex plug assembly of claim 2, wherein the combinative cover-halves each have a plurality of pins and holes formed therein, said holes in each cover-half being formed opposite corresponding pins in the other cover half, whereby said resistance fit is accomplished by frictional insertion of each pin in a corresponding hole.

5. The friction detent duplex plug assembly of claim 4, wherein at least one of said opposing channels of said first plug cover-half and second plug cover-half is formed with a support lip therein for clasping the fiber optic cable extending from the connector plug when said second plug cover-half is combined with said first plug cover-half, thereby supporting said fiber optic cable rearwardly of the connector plugs and providing strain relief thereto.

6. A friction detent duplex plug assembly, comprising:
   a first plug cover-half formed with a pair of fitted cavities therein for seating up to two simplex connector plugs terminating respective simplex fiber optic cables, or alternatively, one duplex connector plug terminating a duplex fiber optic cable, said first plug cover-half also being formed with a rearwardly extending channel exiting said first cover-half from each of said cavities; and
   a second plug cover-half formed with a pair of opposing fitted cavities and a rearwardly extending channel exiting said second cover-half from each of said cavities, said second plug cover-half being combinative with said first plug cover half by resistance fit to confine said two simplex connector plugs or one duplex connector plug therebetween;
   whereby a pair of simplex connector plugs may be enclosed within said first and second plug cover-halves, and a pair of fiber optic cables extending from said connector plugs may be seated in said channels for use as a duplex connector plug assembly.

7. The friction detent duplex plug assembly of claim 6, wherein at least one of said opposing channels of said first plug cover-half and second plug cover-half is formed with a support lip therein for clasping the fiber optic cable extending from the connector plug when said second plug cover-half is combined with said first plug cover-half, said support lip thereby providing strain relief to said fiber optic cable.

8. The friction detent duplex plug assembly of claim 6, wherein the combinative cover-halves each have a plurality of pins and holes formed therein, said holes in each cover-half being formed opposite corresponding pins in the other cover half, whereby said resistance fit is accomplished by frictional insertion of each pin in a corresponding hole.

* * * * *